United States Patent
Fuller et al.

(10) Patent No.: US 9,803,132 B2
(45) Date of Patent: Oct. 31, 2017

(54) METHODS FOR ALTERING FLUID RHEOLOGY

(71) Applicant: CHEVRON U.S.A. INC., San Ramon, CA (US)

(72) Inventors: Michael James Fuller, San Ramon, CA (US); Maricel Marquez, San Ramon, CA (US); William David Norman, San Ramon, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 25 days.

(21) Appl. No.: 14/768,874

(22) PCT Filed: Feb. 18, 2014

(86) PCT No.: PCT/US2014/016897
§ 371 (c)(1),
(2) Date: Aug. 19, 2015

(87) PCT Pub. No.: WO2014/130448
PCT Pub. Date: Aug. 28, 2014

(65) Prior Publication Data
US 2016/0032174 A1   Feb. 4, 2016

Related U.S. Application Data

(60) Provisional application No. 61/768,066, filed on Feb. 22, 2013.

(51) Int. Cl.
*E21B 43/267* (2006.01)
*C09K 8/80* (2006.01)
(Continued)

(52) U.S. Cl.
CPC ............... *C09K 8/685* (2013.01); *C09K 8/80* (2013.01); *E21B 43/26* (2013.01); *E21B 43/267* (2013.01); *C09K 2208/10* (2013.01)

(58) Field of Classification Search
CPC . C09K 8/80; C09K 8/68; C09K 8/685; C09K 8/665; E21B 43/267; E21B 43/26
See application file for complete search history.

(56) References Cited

U.S. PATENT DOCUMENTS

| | | |
|---|---|---|
| 6,357,527 B1 | 3/2002 | Norman et al. |
| 2003/0075324 A1 | 4/2003 | Dusterholf et al. |

(Continued)

FOREIGN PATENT DOCUMENTS

WO   WO 2012/071462   5/2012

OTHER PUBLICATIONS

International Preliminary Report on Patentability dated Aug. 25, 2015 for Appln. No. PCT/US2014/016897.
International Search Report as issued for PCT/US2014/016897.

*Primary Examiner* — Zakiya W Bates
(74) *Attorney, Agent, or Firm* — Pillsbury Winthrop Shaw Pittman, LLP

(57) ABSTRACT

A method includes placing a treatment fluid including a crosslinked gel in a wellbore penetrating a subterranean formation, the crosslinked gel including a gelling agent and a borate crosslinking agent, de-crosslinking a portion of the crosslinked gel, the de-crosslinking induced by a sufficient change in operating pressure, the de-crosslinking providing a release of active sites on the borate crosslinking agent and reducing the viscosity of the treatment fluid, and providing a borate-affinity agent to capture the released active sites on the borate crosslinking agent. A fracturing fluid includes a gelling agent, a borate crosslinking agent, a latent borate-affinity agent, and a proppant.

22 Claims, 3 Drawing Sheets

(51) Int. Cl.
 C09K 8/68 (2006.01)
 E21B 43/26 (2006.01)

(56) References Cited

U.S. PATENT DOCUMENTS

2008/0237123 A1 10/2008 Marston
2009/0044945 A1 2/2009 Willberg et al.
2013/0220621 A1 8/2013 Legemah et al.

METHODS FOR ALTERING FLUID RHEOLOGY

STATEMENT OF RELATED APPLICATIONS

This application is the U.S. National Stage of PCT/US2014/016897 filed Feb. 18, 2014, which in turn claims priority to U.S. Provisional Application No. 61/768,066, filed Feb. 22, 2013, the entire contents of both applications are hereby incorporated by reference in their entireties.

TECHNICAL FIELD

The present application relates to methods employed during wellbore operations in subterranean formations, and more specifically to methods for altering fluid rheology in wellbore operations.

BACKGROUND

The treatment of subterranean formations penetrated by a wellbore with fracturing fluids to stimulate the production of hydrocarbons is well-established. In general, such treatments are conducted by injecting a liquid, gas, or two-phase fluid down the wellbore at sufficient pressure and flow rate to fracture the subterranean formation. A proppant material, such as sand, fine gravel, sintered bauxite, glass beads, or the like, may also be introduced into the fractures to keep the fractures open after the fracturing pressure is released. Propped fractures provide larger flow channels through which an increased quantity of a hydrocarbon may flow, thereby increasing the productivity rate of the well. Fracturing operations may be combined with gravel packing operations in a technique known as frac-packing, which combined operations are designed provide both a barrier to formation sand production as well as proppant flowback.

Fracturing fluids generally include a gel comprising a gelling agent and a crosslinker, such gels providing useful rheological properties for fracturing. The rheological requirements of a fracturing fluid are subject to numerous design considerations. First, the fracturing fluid should have rheological characteristics that permit it to be pumped down the wellbore without excessive difficulty or pressure drop friction losses. In order to adequately propagate fractures in the subterranean formation, a fracturing fluid should provide sufficient viscosity to fracture the target interval and maintain sufficient fracture width to admit proppant. The fracturing fluid is also expected to provide sufficient viscosity to transport and deposit the proppant into the cracks in the formation formed during fracturing. During non frac-packing operations, the ideal fracturing fluids may optionally exhibit a low leakage rate into the formation during the fracturing operation. Finally, the fracturing fluid is also ideally designed to reduce in viscosity following fracture placement and readily flow back into the wellbore after the fracturing is complete, leaving minimal residue that could impair permeability and productivity of the formation.

In order to improve removal of the fracturing fluid after the fracturing operation, chemical additives are typically employed to "break" the fluid viscosity, which may include oxidizing agent chemicals or enzymes. Such reagents are typically designed to react with the gelling agent (polymer) portion of a gel, while the crosslinker is merely a spectator. However, with the complicated cooldown-profile during fracturing treatments, and the spectrum of temperatures at various depths into the fracture, chemical breakers must be carefully metered for varying concentration to be used at various times within a fracturing stage. Additionally, many chemical breakers have limited abilities to control the rate of breaking leading to frequent premature-breaking of the fluid and service quality issues in field operations. Premature break of the fluid with current chemical breaker technologies may lead to premature "screen-out" of the fracturing treatment, leading to stalled growth of the fracture geometry, reduced fracture penetration into the formation, and ultimately reduced hydrocarbon productivity of the fracture.

SUMMARY

In some aspects, embodiments disclosed herein relate to methods comprising placing a treatment fluid comprising a crosslinked gel in a wellbore penetrating a subterranean formation, the crosslinked gel comprising a gelling agent and a borate crosslinking agent, the method comprising de-crosslinking a portion of the crosslinked gel, the de-crosslinking induced by a sufficient change in operating pressure, the de-crosslinking providing a release of active sites on the borate crosslinking agent and reducing the viscosity of the treatment fluid, and the method comprising providing a borate-affinity agent to capture the released active sites on the borate crosslinking agent.

In other aspects, embodiments disclosed herein relate to fracturing fluids comprising a gelling agent, a borate crosslinking agent, a latent borate-affinity agent, and a proppant.

Although the various steps of the method according to one embodiment of the invention are described in the above paragraphs as occurring in a certain order, the present application is not bound by the order in which the various steps occur. In fact, in alternative embodiments, the various steps can be executed in an order different from the order described above or otherwise herein.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
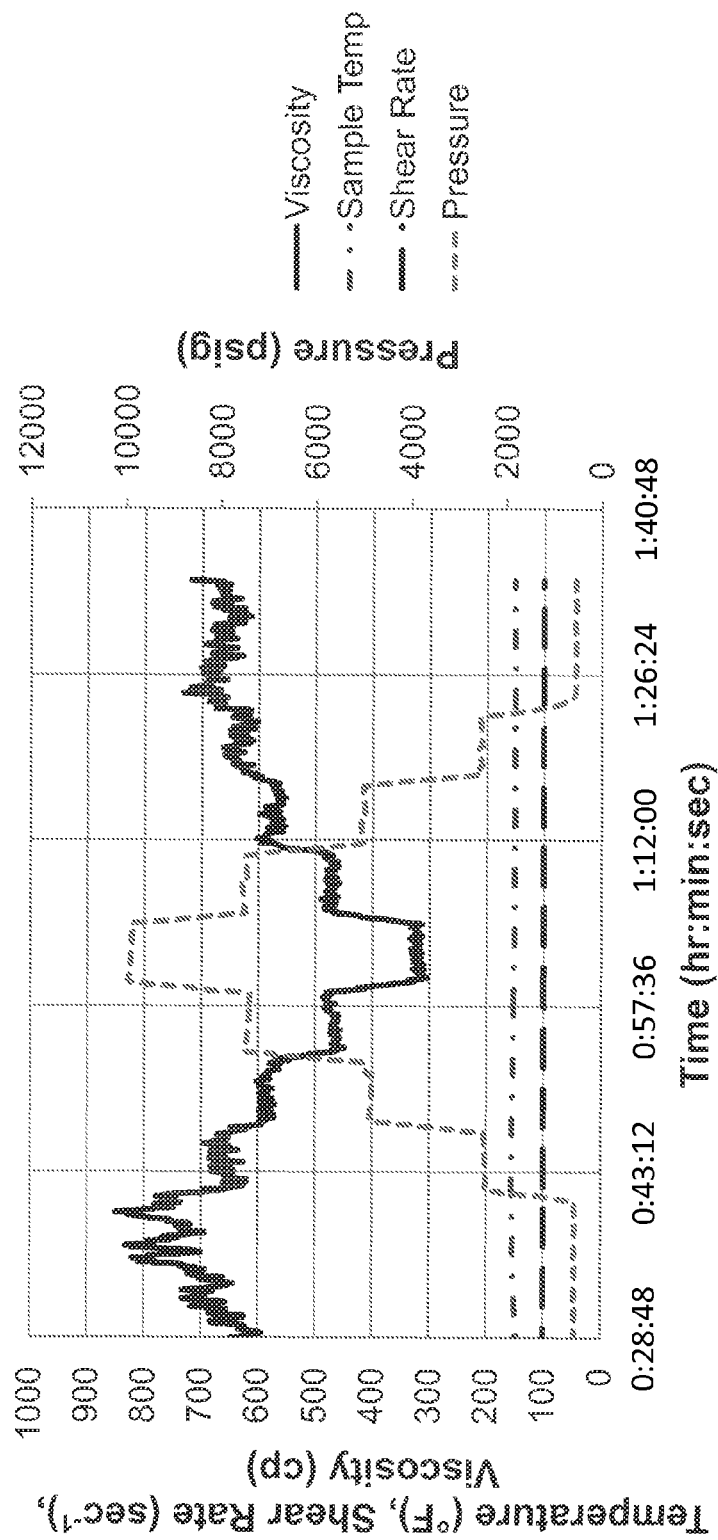
FIG. 1 shows a plot of viscosity at several high applied-pressures for a gelled treatment fluid comprising 25 lbm/Mgal guar+2.95 lbm/Mgal Borax in 10.5 ppg NaBr (pH 10.0), 100 sec$^{-1}$, at 150° F.

Embodiments disclosed herein relate to methods for harnessing pressure-induced changes in the viscosity of borate crosslinked fracturing and frac-pack gels to improve cleanup of fracturing fluids and allow hydrocarbon production through the porous proppant pack after fracturing operations. Pressure-induced thinning of borate gels has been indicated to be a reversible process. When initially blended at a high-pH, a boron-containing crosslinker and a gelling agent form a multidentate crosslink motif resulting in a gel structure where the crosslinker forms a four-point bond between two adjacent polymer (gelling agent) chains. As indicated in FIG. 1, increasing the pressure on such a crosslinked gel can significantly reduce the gel viscosity, while removing the applied pressure can restore the gel viscosity. Without being bound by theory, this pressure-dependent viscosity behavior may be attributed to the high-pressure converting a portion of a borate species from the tightly-crosslinked form into a form that is ineffective as a crosslinker. The released boron species is believed to be a modified form of the original boron-containing crosslinker.

In accordance with embodiments disclosed herein, it was recognized that a released boron species (either partially or fully dissociated) might be captured either in the modified form of borate species or in transition between active/inactive borate species with borate-affinity agents capable of sequestering borates. Furthermore, methods employing such borate-affinity agents may render the pressure-induced thinning process irreversible even after ambient pressures are restored, while rendering the fluid viscosity broken for improved production of the fracturing fluid from within the fracture to the surface. In some embodiments, methods disclosed herein may also allow for better control over the speed of the gel breakdown, as breakdown can be finely-controlled by tuning the pressure exerted on the fracturing fluid to induce de-crosslinking. Further advantages over chemical breakers, which operate by eroding the gelling agent portion of the gel structure, may include that such chemical breakers may environmentally undesirable. This may represent a significant advantage over conventional chemical breakers.

Figure 2:
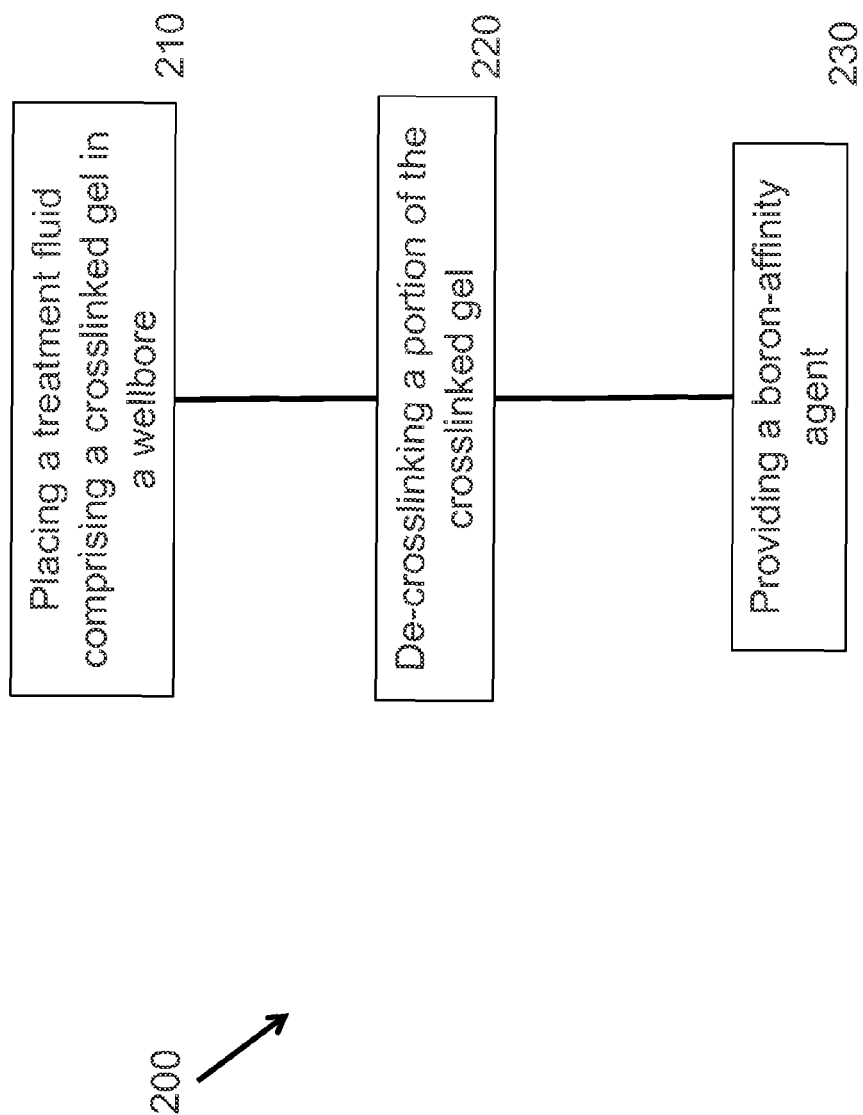
FIG. 2 shows a flow scheme of a method, in accordance with embodiments disclosed herein.

Referring to FIG. 2, embodiments disclosed herein provide methods 200 comprising placing a treatment fluid comprising a crosslinked gel in a wellbore penetrating a subterranean formation (210), the crosslinked gel comprising a gelling agent and a crosslinking agent comprising boron, the method comprising de-crosslinking a portion of the crosslinked gel (220), the de-crosslinking induced by a sufficient change in operating pressure, the de-crosslinking providing release of active sites on borate crosslinking agent and reducing the viscosity of the treatment fluid, and providing a borate-affinity agent (230) to bind to active sites on the on the borate crosslinking agent.

Figure 3:
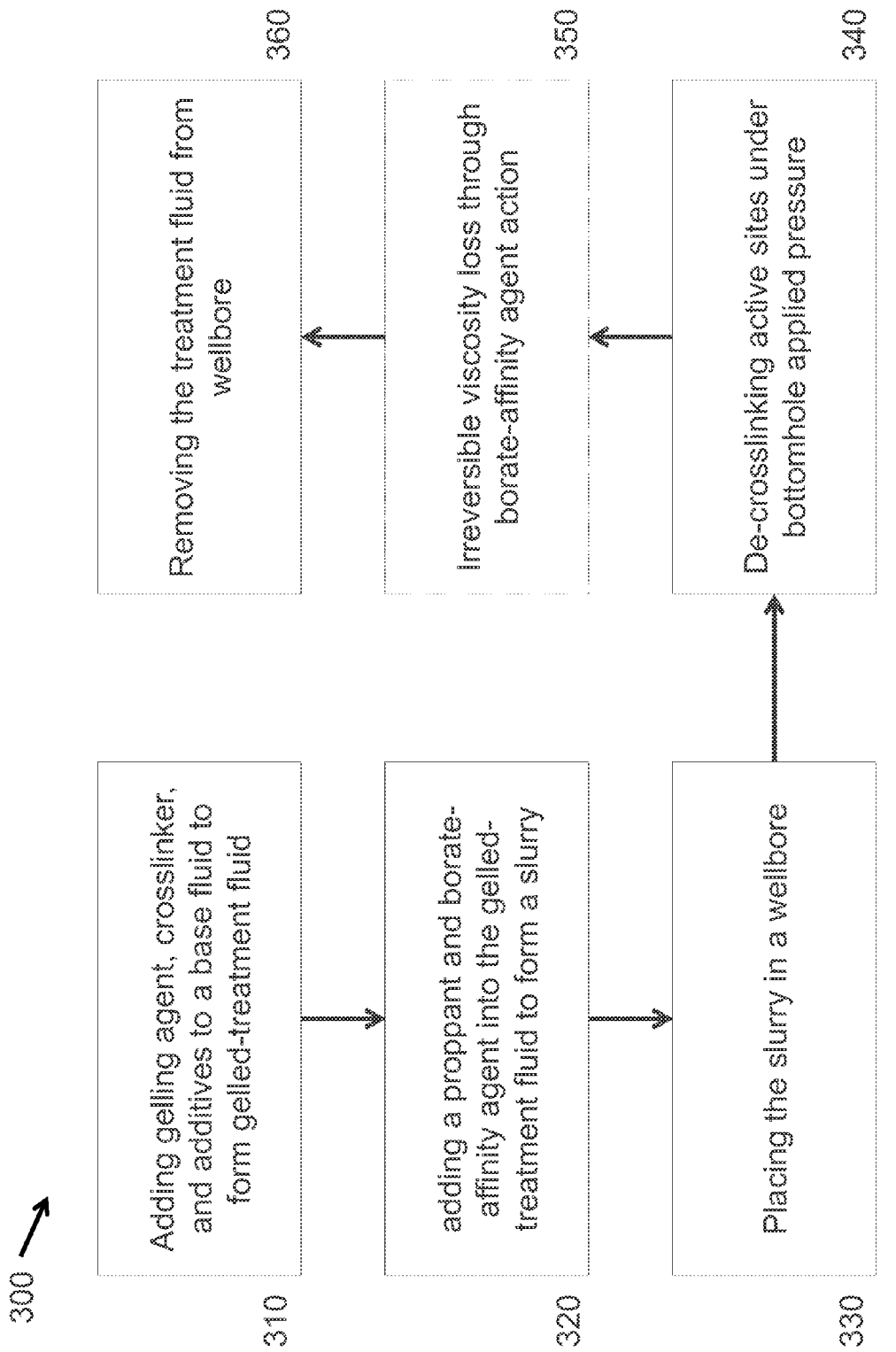
FIG. 3 shows another flow scheme of a method, in accordance with embodiments disclosed herein.

In practice, methods of the invention may be practiced by formulating a treatment fluid offsite or on the fly. As indicated in FIG. 3, embodiments disclosed herein provide methods 300 comprising generating a gelled treatment fluid by adding gelling agent, boron-based crosslinker, and additives to a base fluid (310). Methods 300 further comprise adding a proppant and borate-affinity agent into the gelled treatment fluid (320) in the form of a slurry. Such slurry treatment fluids comprising a proppant may be suitable for fracturing or frac-packing operations. Methods 300 further comprise placing the slurry comprising proppant and borate-affinity agent into a wellbore (330). After downhole operations are carried out with the aid of the slurry, the gel portion of the slurry is de-crosslinked under bottomhole applied pressure releasing active sites on the boron-based crosslinker (340). The revealed active sites on the boron-based crosslinker may be captured by the borate-affinity agent leading to an irreversible viscosity loss (350) as the gel breaks down. Gel breakdown then facilitates removing what is left of the treatment fluid from wellbore (360).

Without being bound by theory, the "de-crosslinking" or "gel breakdown" or "viscosity reduction" step in methods disclosed herein may comprise partial and/or complete dissociation of the boron-based crosslinkers from the gelling agent. For example, in a fully crosslinked motif, boron may be engaged in a four point binding interaction bringing together two polymer molecules of gelling agent. Applied pressure may distort or otherwise change boron's binding capability to engage in the four point binding motif and resulting in release of at least one of the two polymer molecules of gelling agent. In some such instances, the borate-affinity agent may intercept and form a cap on boron that prevents re-crosslinking while boron is still associated with a polymer molecule of gelling agent, perhaps in a two point bonding motif. In other instances, an initial association with the borate-affinity agent may form the cap previously described, but the affinity agent further reacts until full dissociation of the boron-based crosslinking agent from the gelling agent occurs, resulting in the complete sequestration of the boron crosslinker. One skilled in the art will appreciate that combinations of these possible mechanisms (and intermediate mechanisms) for boron capture may also be present. Regardless of the actual mechanism, the reduced degree of crosslinking may provide the requisite reduction in viscosity of the treatment fluid.

Treatment fluids may be used in a variety of subterranean treatments. As used herein, the term "treatment," refers to any subterranean operation that uses a fluid in conjunction with a desired function or purpose. The term "treatment," does not imply any particular action by the fluid. Examples of common subterranean treatments include, without limitation, drilling operations, pre-pad treatments, fracturing operations, perforation operations, preflush treatments, afterflush treatments, sand control treatments (e.g., gravel packing), acidizing treatments (e.g., matrix acidizing or fracture acidizing), diverting treatments, cementing treatments, and wellbore clean-out treatments. For example, in certain fracturing treatments, generally a treatment fluid (e.g., a fracturing fluid or a "pad fluid") is introduced into a wellbore that penetrates a subterranean formation at a sufficient hydraulic pressure to create or enhance one or more pathways, or fractures, in the subterranean formation. These cracks generally create a highly conductive channel with deep reach into the reservoir, to improve hydrocarbon production and increase the "effective permeability" of that portion of the formation. The fluid may comprise particulates, such as proppant particulates, that are deposited in the resultant fractures. The proppant particulates are thought to help prevent the fractures from fully closing upon the release of the hydraulic pressure, forming conductive channels through which fluids may flow to a well bore penetrating the formation. While embodiments disclosed herein are primarily directed to such fracturing operations, treatment fluids may be used in any subterranean operation wherein a change in fluid viscosity, particularly wherein a reduction of viscosity, may be useful during the operation.

The term "gel," and related terms such as "crosslinked gel," as used herein, refers to a semi-solid, jelly-like state assumed by some colloidal dispersions. Crosslinked gels, in particular, are gels formed by mixing a gelling agent with a crosslinking agent.

A treatment fluid or fracturing fluid comprises a crosslinked gel comprising a gelling agent. Suitable gelling agents for methods employing treatment fluids may comprise any polymeric material capable of increasing the viscosity of a treatment fluid and, in some embodiments, are hydratable. In some embodiments, the gelling agent may comprise one or more polymers that can form a crosslink in a crosslinking reaction in the presence of a crosslinking agent. The gelling agents may be naturally-occurring gelling agents, synthetic gelling agents, or a combination thereof. The gelling agents also may be cationic gelling agents, anionic gelling agents, nonionic gelling agents, amphoteric gelling agents, or a combination thereof. Suitable gelling agents include, but are not limited to, polysaccharides, biopolymers, and/or derivatives thereof that comprise one or more of monosaccharide units, such as galactose, mannose, glucose, xylose, arabinose, fructose, glucuronic acid, or pyranosyl sulfate. Examples of suitable polysaccharides include, but are not limited to, guar gum and derivatives (e.g., underivatized guar, hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, diutan, locust bean gum, tara, konjak, tamarind, starch, karaya, tragacanth and carrageenan. Hydratable synthetic polymers and copolymers which comprise, for example, hydroxyl, cis-hydroxyl, carboxyl, sulfate, sulfonate, amino and/or amide functional groups may be suitable gelling agents. In some such embodiments, such polymers and copolymers may comprise polyacrylate, polymethacrylate, polyacrylamide, maleic anhydride, methylvinyl ether polymers, polyvinyl alcohol and polyvinylpyrrolidone. In particular, gelling agents may be selected and/or synthetically designed based on (1) their ability to be crosslinked with borate-based crosslinking agents, and (2) the effects of high-pressures on such crosslinking, in particular the ability to reduce viscosity with applied pressure. In certain embodiments, the gelling agents comprise guar gums.

In some embodiments, methods disclosed herein may employ crosslinked gels in treatment or fracturing fluids with loadings in a range of from about 15 to about 60 lbm of gelling agent/1000 gals in the blended treatment or fracturing fluid. Those skilled in the art, with the benefit of this disclosure will appreciate the appropriate gel loading for a particular treatment or fracturing operation according to the composition and conditions of the formation in which the fluids are being employed, in conjunction with the desired function of the treatment of fracturing fluid.

The crosslinked gels disclosed herein employ crosslinking agents comprising boron. Such reagents are typically borates or borate derivatives. The borate crosslinking compounds commonly contain boric acid, borate salts (such as sodium borate), borax, organic borate compounds, such as aryl or alkyl borates, and combinations thereof. Those skilled in the art will appreciate that appropriate borates may be selected to modulate the degree of crosslinking as well as the stability of crosslinking. In some embodiments, the borate may be selected to provide a shift in crosslinking stability to higher temperatures. One example of a means to shift that stability is to delay the solubility of active borate species into solution, including use of solid minerals that contain borates, such as ulexite, colemanite, probertite, and mixtures thereof. Further stability may be achieved by any combination of steric and electronic effects of the borate and/or the gelling agent. Another common means of stabilizing the borate-crosslinked gel at higher temperatures is through the use of crosslink-delay agents, which comprise organic additives that associate with the boric acid or borate derivative and subsequently release the active form for crosslinking after a time-delay. Optional delay agents may include organic polyols, such as sodium gluconate, sodium glucoheptonate, sorbitol, glyoxal, mannitol, phosphonates, and aminocarboxylic acids and their salts (EDTA, DTPA, and the like). In some embodiments, altering crosslinking stability may provide borate crosslinked gels that can be employed in subterranean operations where borate crosslinked gels are not otherwise indicated. For example, borate crosslinked guar gums not containing additional metallic crosslinkers are commonly employed under conditions generally not exceeding about 160° C., and typically not exceeding 150° C. As such, operations in which borate crosslinked guar gums may be applied may be limited.

In some embodiments, the scope of applicable operations may be expanded by increasing the temperature stability of the crosslinked gel, with the proviso that the crosslinked gel should still exhibit reversible pressure-induced thinning. The ability of a given crosslinked gel to exhibit reversible pressure-dependent viscosity changes is readily determined Methods to determine the magnitude of viscosity-changes with pressure involve the use of specialized high-pressure rheometers capable of measuring viscosity at pressures greater than about 10,000 psi. Testing to validate this phenomenon should include an initial measurement of the viscosity at a set shear-rate and at the expected bottomhole temperature under low applied pressure (i.e. less than about 1,000 psi) followed by progressive increases in pressure up to a pressure that may be expected downhole. Pressure-induced thinning has been previously evidenced in borate-crosslinked fluids as a 20 to 90% loss in viscosity which increases in magnitude with pressure.

In some embodiments, a concentration of borate crosslinking agent employed in methods disclosed herein may be selected such that they are of sufficient quantity to provide a crosslinked viscosity of about 100 mPa*s or more. As various forms of borate may be used in the crosslinking of gelling agents described herein, the active concentration of boron may range from about 10 to about 100 mg/L. Those skilled in the art, with the benefit of this disclosure will appreciate the appropriate amount of crosslinker to achieve a target viscosity for a particular treatment or fracturing operation.

Methods employing treatment fluids and fracturing fluids comprise de-crosslinking (i.e. crosslink deactivation or reducing the degree of crosslinking) a portion of the crosslinked gel, the de-crosslinking induced by a sufficient change in operating pressure, the de-crosslinking providing a released or partially-released borate crosslinking agent and reducing the viscosity of the treatment fluid. Pressure-induced thinning may correlate with degree of inactivation of the sites available on boron to participate in crosslinking or the degree of polymer-crosslink in the gel. One skilled in the art will appreciate that crosslinking motifs may vary and involve combinations of monodentate, bidentate, and multidentate interactions between functional groups present on the gelling agents both intramolecularly and intermolecularly. However, under gel formulating conditions at ambient pressures, the most stable form of crosslinking is believed to be a four-point (multidentate) bonding motif joining two adjacent polymer chains. De-crosslinking may comprise reducing the number of binding sites from the former multidentate interaction. Such reduction may include partial and/or complete separation of a released borate crosslinking agent, although it is believed that partial separation, i.e. the dissociation of just one of the two polymer chains of the gelling agent may be the predominant mode. Regardless of the actual bonding motif present, the observed viscosity reduction likely correlates with a reduction in the degree of crosslinking.

The initial effects of de-crosslinking can first be observed at applied pressures in excess of about 2,000 psi in a system employing borate-guar gum at pH from about 9 to about 11.5. Thus, in some embodiments, a sufficient change in operating pressure may comprise a rise from an ambient pressure up to about 2,000 psi. In other embodiments, a sufficient change in operating pressure during a fracturing treatment may be in a range of from ambient pressure up to about 12,000 psi. One skilled in the art will appreciate that these figures are approximations and that individual gelling agent/crosslinking agent combinations along with other operational conditions such as temperature and pH will play a role in determining in the magnitude of viscosity reduction at high operating pressure.

In addition to the pressure-induced effect on crosslinking, borate crosslinked gels useful in methods disclosed herein may also exhibit both shear-thinning and thermal thinning. A thermally-thinned fluid may, upon cooling, rapidly restore a gel state and hence the viscosity of the fluid. In some embodiments, methods disclosed herein may take advantage of these temperature and shear effects on viscosity coupled with the pressure-induced thinning to further modulate the chemical equilibrium in the degree of crosslinking in the crosslinked gels. Thus, in some embodiments, methods disclosed herein may use any combination of pressure, temperature, and shearing to modulate viscosity. In some embodiments, alteration of chemical conditions, such as pH, salinity, and presence of additives (including ligands/delay agents) may also be employed to modulate viscosity. Still further, methods disclosed herein can be used in combination with conventional chemical and enzymatic breakers.

In some embodiments, methods disclosed herein provide treatment fluids that comprise fracturing fluids and as such further comprise a proppant. Proppants typically comprise particulate solids. Examples of suitable proppants include without limitation, sand, bauxite, sintered bauxite, silica alumina, glass beads, ceramic materials, glass materials, polymer materials, polytetrafluoroethylene materials, nut shell pieces, seed shell pieces, fruit pit pieces, wood, composite particulates, gravel, or combinations thereof. Generally, the particulate solids may have a particle size in the range of from about 2 to about 400 mesh, U.S. Sieve Series. In particular, the proppant may have a particle size in the range of from about 10 mesh to about 70 mesh, U.S. Sieve Series. More particularly, the particle size distribution ranges of the proppant may be about 10 to about 20 mesh, 20 to 40 mesh, 40 to 60 mesh or 50 to 70 mesh, depending on the particular size and distribution of formation solids to be screened out by the particulate solid pack. Although the proppant may be of any shape, the proppant generally may be spherical. However, proppants with other particulate solid shapes may also be utilized such as without limitation, ellipsoidal, platelet-shaped, toroidal, oblate spheroids, prolate spheroids, scalene spheroids, rod-like, or combinations thereof.

In some embodiments, methods that employ fracturing fluids comprise a placing step which involves applying the fracturing fluid at a sufficient pressure and at a sufficient rate to fracture the subterranean formation without causing substantial de-crosslinking. Thus, such methods may involve pumping the fracturing fluid (often as a slurry) at a pressure below the threshold pressure that would otherwise induce de-crosslinking. Those skilled in the art will appreciate that an appropriate pressure and sufficient rate to fracture a subterranean formation may depend on, inter alia, bottomhole conditions and the compositional nature of the formation being fractured. For example, in some embodiments a sufficient pressure and a sufficient rate to fracture the formation may comprise downhole pressures in a range from about 3,000 to about 18,000 psi and rates in a range of from about 15 to about 120 barrels/min. One skilled in the art will recognize that these figures are merely exemplary approximations and factors such as permeability of the formation may play a role in selection of exact conditions to promote fracturing. Other factors which may impact the fracturing treatment conditions (specifically impacting the fluid/slurry) include completion dimensions (inner diameter), perforation size, perforation density, cluster spacing of perforations, the presence of screens for sand control, and the like. The exact selection of conditions for successful fracturing may be aided by computational modeling of the formation.

After fracturing, methods disclosed herein comprise de-crosslinking a portion of the crosslinked gel, the de-cross-linking induced by a sufficient change in operating pressure, the de-crosslinking providing a released borate crosslinking agent and reducing the viscosity of the fracturing fluid. Providing a sufficient change in operating pressure may include providing a pressure pulse, either as a rapid, momentary pulse or one that is held at the high pressure for a sufficient period, to de-crosslink the crosslinked gel and allow the borate-affinity agent to react with the released active sites on the borate crosslinking agent. The pressure-released active sites on the borate crosslinking agent can then be irreversibly bound to the borate-affinity agent carried in the fracturing fluid. The reduction in viscosity in the fracturing fluid may be substantial. For example, during fracturing the initial crosslinked gel fluid may have a viscosity within the fracture ranging from about 100 to about 1,000 mPa*s at 100 sec$^{-1}$. After de-crosslinking and capturing the released borate crosslinking agent the fracturing fluid may be expected to have a viscosity in a range of from about 20 to about 100 mPa*s or in some cases from about 20 to about 25 mPa*s.

In some embodiments, the pressure required to effectively perform a fracturing operation may be sufficiently high at bottomhole static temperature to thin the gel viscosity due to pressure-induced thinning. In such embodiments, the temperature dependency on fluid viscosity may be employed by taking advantage of reservoir cooldown in order to maintain a fluid viscosity high enough to carry proppant during the treatment and to prevent premature crosslink inactivation by pressure. Thus, after fracturing fluid injection at fracturing pressure, the fracturing fluid may be shut-in within the fracture and then allowed to heat up to bottomhole temperatures, which under pressure would provide the requisite pressure-induced thinning of the fluid and release of borate crosslinking agent active sites. The released borate active sites would then react with the borate-affinity agent in the fracturing fluid allowing the fracturing fluid to remain irreversibly thinner (broken) to improve cleanup on flowback to the surface. In some embodiments, the boron affinity agent present in the treatment or fracturing fluid is beneficially provided as a solid material insoluble in the fluid. Thus, the solid borate-affinity agent binds to the solution-phase active sites on the borate crosslinker, rendering it unable to re-heal the crosslink. By providing such a two-phase format, the crosslinked gel may be sufficiently kinetically stable to prevent premature sequestration of the crosslinker by the boron affinity agent. This may be particularly important if a boron affinity agent is selected to have a stronger binding to the crosslinker than the gelling agent. In other embodiments, the two phase format may help drive an equilibrium to favor de-crosslinking where gelling agent and boron affinity agent have comparable binding strength to the crosslinker.

It has been observed that bottomhole pressures exceeding about 1000 psi may be present during some fracturing operations and in some crosslinked gel systems (borate-guar gum) these conditions can reversibly reduce the fracturing fluid viscosity up to the viscosity of the uncrosslinked gelling agent solution. The reversible alteration of viscosity, however, provides the opportunity to correct the viscosity to the values experienced under useful pressures. By way of example, the degree to which a fracturing fluid experiences pressure-induced thinning may be lower at reduced temperatures, i.e. as the fracturing fluid temperature is reduced. In some embodiments, there may be a threshold pressure below which no appreciable viscosity loss occurs; this may allow a controlled release of the active sites of the borate crosslinking agent with application of a pressure pulse above this threshold.

Without being bound by theory, it has been postulated that at ambient pressures, a borate crosslinker is a highly effective and engages in a 4-point binding motif in a crosslinked gel system. However at high pressures, the borate equilibrium shifts in favor of a modified species less capable of crosslinking, releasing several active sites. In some embodiments, the borate-affinity agents may be added to the fracturing fluid to capture some or all of the active sites on the borate species before it is allowed to re-crosslink the gelling agent and restore the original viscosity of the fracturing fluid. As described above, in some embodiments, the borate-affinity agent may be beneficially provided in solid form for this purpose. The net result of this method is an irreversible pressure-induced thinning of the fracturing fluid via gel breakdown.

Methods disclosed herein employ borate-affinity agents in the treatment or fracturing fluids, with the function of capturing the released active sites on the borate crosslinking agent present upon pressure-induced thinning, i.e. de-crosslinking. In some embodiments, the borate-affinity agent is present in the treatment or fracturing fluid. In particular embodiments, it is present in a solid form and is included as a component in the gel/proppant slurry. In some embodiments, the solid form of borate-affinity agent is provided as a slurried form of small solid particles facilitating addition through a liquid additive pump, rather than a solid feed. In some embodiments, methods disclosed herein may comprise providing the borate-affinity agent separately from the treatment or fracturing fluid by introducing it to the fluid immediately prior to performing the de-crosslinking step. This may be particularly useful where downhole conditions or the fracturing conditions may lead to premature de-crosslinking. In some embodiments, the borate-affinity agent may be coated on the proppant material in a fracturing fluid. For example, borate-affinity agents may be provided as polymeric coatings. Such coatings may comprise polyvinyl alcohol (PVA) and PVA modified with N-methylglucamine (MGA) and other MGA modified polymers. When employing PVA polymers a sufficient molecular weight may be selected to avoid dissolution of the PVA in the base fluid of the fracturing fluid, as described herein further below. These polymers may be coated onto the surface of propping agents prior to being transported to the wellsite, and subsequently used in the fracturing treatment. Their application in capturing released borate crosslinking agent sites may be effected either during application of a pressure-pulse or during shut-in and heating (under pressure).

The nature of the borate-affinity agent may vary. In some embodiments, the borate-affinity agent may have a greater affinity for the released borate crosslinking agent than the gelling agent. In some embodiments, the borate-affinity agent may not have a greater affinity than the gelling agent, but may be provided in sufficient quantity to drive an equilibration to de-crosslink by Le Chatelier's principle.

In some embodiments, the borate-affinity agent may be separated from the fluid through use of an inert coating that may minimize premature interaction with the borate crosslinker. In some embodiments, the borate-affinity agent may be encapsulated. In some such embodiments, methods may include pumping the fracturing fluid at a pressure that will not significantly lead to pressure-induced thinning where the borate-affinity agent is protected by an encapsulated coating. The encapsulating coating may be breached leading to the release of the boron affinity agent, for example, during a pressure-pulse applied from the surface; in some such embodiments, the same pressure pulse that may provide de-crosslinking. In some embodiments, the encapsulating coating may be breached on closure-stress within the fracture. In still further embodiments, the encapsulating coating may be readily dissolved at high temperature inside the fracture. Each of these methods may rely on a different chemical family of coatings.

Encapsulation chemistries are well known in the art. In some embodiments, the same types of encapsulation strategies used in conjunction with encapsulated oxidative breakers may be employed in methods disclosed herein. Suitable encapsulation materials may include various polymers, including homopolymers and copolymers, of ethylenically unsaturated monomers such as ethylene, propylene, isobutylene, vinyl chloride, vinylidene chloride, styrene, ethyl cellulose and other cellulosic materials having similar properties, and vinyl acetate. In addition, to these polymers, hydrocarbon waxes may be employed as encapsulating agents. Still further encapsulating agent may include polymers of ethylene oxide, propylene oxide or combination thereof, epoxides, and polycarbonates. In particular embodiments, the encapsulating agent may include polyethylene, polypropylene, polyisobutylene, polyvinylacetate, copolymers of vinyl chloride and vinylidene chloride, copolymers of styrene and butadiene, copolymers of vinylidene chloride and an ester of an unsaturated carboxylic acid such as methylacrylate, copolymers of ethylene and an unsaturated carboxylic acid and/or salt thereof such as acrylic acid or its sodium salt and copolymers of ethylene and vinyl acetate.

In some embodiments, the borate-affinity agent may comprise a solution and the solution may be encapsulated. For example, concentrated solutions of borate-affinity agents may comprise aqueous solutions of derivatized or underivatized PVA or other products or nonaqueous solutions of other borate-affinity agents, such as solutions of N,N-Bis(2,3-dihydroxypropyl) octadecylamine in 2-ethoxyethanol. For use of encapsulated solutions, methods of releasing these agents to allow the capture of the released borate crosslinking agent may include crushing of the encapsulant under either an applied pressure-pulse following fracturing or through closure stress within the walls of the fracture.

In some embodiments, the borate-affinity agent comprises a solid polymer. The borate-affinity agents described herein may be in a solid form which would remain undissolved by the fracturing fluid including during fracturing. In some embodiments, solid borate-affinity agent may be added as polymer fibers, flakes or the like, or as coatings on propping agents or clays/zeolites. The borate-affinity agent may be designed to not to disrupt the crosslinking ability of the crosslinking agent of the gel or the fracturing fluid stability during the fracture operation.

In some embodiments, the borate-affinity agent only reacts with and captures the released active sites on the borate crosslinking agent after the fracture is placed and only upon pressure-induced liberation of the released borate crosslinking agent. In some embodiments, solid borate-affinity agents may serve either as coatings on proppants, or in other embodiments, may themselves act as agents for proppant flowback control, particularly when polymer fibers are employed.

In some embodiments, solid polymer borate-affinity agents may comprise an N-methylglucamine modified polymer. Suitable polymers may include, without limitation, polyvinyl alcohol (PVA) and polymers/resins modified with N-methylglucamine (MGA); examples of MGA-modified polymers may include styrene-divinylbenzene polymers modified with MGA. Both of these polymers can be industrially processed into fiber form, and can be added to a fracturing fluid as suitable borate-affinity agent.

Where polyvinyl alcohol polymer is employed some (slow) solubility into aqueous fluids may disrupt aqueous fracturing fluid stability. Therefore, in some embodiments, a form or molecular weight of PVA may be employed where its solubility into the fluid is slower than the pumping time for the fracture treatment. In some such embodiments, the molecular weight may be on the order of about tens of thousands Daltons or, in other embodiments, more than at least about 100,000 g/mol. In some embodiments, PVA use may be limited to reservoirs where the bottomhole temperature is below the temperature of rapid solubility in aqueous base fluids. Formation cooldown, as employed during certain fracturing methods, as described herein, may also provide sufficient delay to solubility for PVA to render it useful. Therefore, one skilled in the art will appreciate the exact choice of molecular weight of PVA may vary according to the conditions under which the treatment or fracturing fluid is to be applied.

In some embodiments, the borate-affinity agent comprises a metal oxide or hydroxide. Many (solid, insoluble) metal oxide, metal hydroxide, and mixed metal hydroxide materials are also known in the art that demonstrate a high affinity for boron and may be added to fracturing fluids for removal of the released active sites on the borate crosslinking agent. Metal oxides may include a variety of forms, such as clays or zeolites, with a molecular affinity for borates; zeolites have a particular advantage in their high (internal) surface area capable of sequestering significant amounts of released borate crosslinking agent. Suitable borate-affinity agents may also include metal-oxide nanoparticles with high affinity for boron removal, which also have the benefit of high surface area:mass ratio. Additionally solid-metal compounds that act as borate-affinity agents in methods disclosed herein include double-layer hydroxides (DLH), such as hydrocallumite and ettringite (based on layered molecular structures of mixed calcium/magnesium/aluminum hydroxides).

In some embodiments, the borate-affinity agent may comprise an activated solid. Activated solids may include activated-carbon, alumina, and bauxite, for example. Activated solids may have varying boron-affinity depending on salinity, pH, and other factors in the aqueous fluid. Activated solids, in either active or encapsulated form may be added to the fracturing fluids and used to capture the released borate crosslinking agent during the high-pressure thinning of the fluid, yielding an irreversible "break" of the fluid viscosity for improved cleanup following the fracture operation.

In some embodiments, fracturing may be combined with gravel packing operations in a process known in the art as frac-packing. In some such embodiments, methods may include introducing a screen for gravel packing and a frac-packing fluid into the wellbore. Gravel packing is a sand-control method used to prevent production of formation sand. In gravel packing operations, a metallic or ceramic screen is placed in the wellbore and the surrounding annulus is packed with prepared gravel of a specific size designed to prevent the passage of formation sand. Gravel packing operations ideally stabilize the formation while causing minimal impairment to well productivity. Suitable gravel packing fluids for use in conjunction with frac-packing, in particular, will be appreciated by those skilled in the art.

After fracturing for frac-packing procedures have been completed and the fracturing fluid viscosity has been reduced, methods disclosed herein may further comprise removing the fracturing fluid from the wellbore after the crosslink-inactivation and the borate-affinity agent captures the borate crosslinker. In some embodiments, the pH of the fluid may be adjusted to reduce any negative impact on wellbore construction materials. Such adjustments may be performed immediately prior to removing the broken fracturing fluid. The removal or cleanup of a fracturing fluid may take place immediately, or may alternatively follow a shut-in of several weeks leaving the fluid downhole.

Any of the methods disclosed herein may be performed in a wellbore that is vertical, horizontal, or deviated. In some embodiments, a wellbore may comprise a combination of vertical horizontal and deviated portions. In some embodiments, methods disclosed herein may be performed in a subterranean formation that is offshore.

Embodiments disclosed herein also provide fracturing fluid compositions comprising a gelling agent, a crosslinking agent comprising boron, a latent borate-affinity agent, and a proppant. In some embodiments, the blended fracturing fluid comprises a gelling agent which may be a guar or modified guar polymer, a borate crosslinker which may include boric acid, sodium borate, borax, or other forms of borate, and an optional breaker chemical which may include soluble or encapsulated oxidizing agents such as sodium persulfate, ammonium persulfate, sodium chlorite, sodium bromate, and others. Breakers may also include alkali metal carbonates, alkali metal bicarbonates, alkali metal acetates, other alkaline earth metal oxides, alkali metal hydroxides, amines, weak acids and the like can be encapsulated with slowly water soluble or other similar encapsulating materials so as to make them act after a desired delay period. Such materials are well known to those skilled in the art and may function to delay the breaking of the crosslinked gel for a required period of time. Examples of water soluble and other similar encapsulating materials that may be suitable include, but are not limited to, porous solid materials such as precipitated silica, elastomers, polyvinylidene chloride (PVDC), nylon, waxes, polyurethanes, polyesters, cross-linked partially hydrolyzed acrylics and the like. In certain embodiments, when a polyvalent metal salt of an organophosphonic acid ester and an alkaline breaker are utilized, e.g., magnesium oxide, an initial increase in the viscosity of the fracturing fluid may be achieved, after which the gel may be further broken. If used, the delayed gel breaker may be present in the fracturing fluid in an amount in the range of from about 0.01% to about 3% w/v, or in an amount in the range of from about 0.05% to about 1% w/v. "w/v" as used herein refers to the weight of the component based on the volume of the liquid that is present in the fracturing fluid.

Fracturing fluids comprise the borate-affinity agents described herein above as "latent" borate-affinity agents. That is, by design fracturing fluids incorporating boron affinity agents provide a mechanism by which the fracturing fluid remains stable, i.e. the borate-affinity agent does not prematurely sequester the crosslinking agent comprising boron. To ensure the borate-affinity agent will not prematurely capture the crosslinker and prematurely thin the fluid, several precautions may be taken and optionally include: (a) adding the borate-affinity agent to the fracturing fluid after all other additives are added and mixed. The borate-affinity agent may be added into the blender when the proppant is introduced into the fracturing fluid; (b) coating or otherwise passivating the borate-affinity agent to ensure it is not released into the fluid until after the pressure-induced effect. In some such embodiments, the latent borate-affinity agent may comprise an encapsulant.

Fracturing fluids may particularly employ latent-boron affinity agent comprising an N-methylglucamine modified polymers. In other embodiments, the latent-boron affinity agent may comprise an encapsulated solution comprising polyvinylalcohol or dihydroxypropyloctadecyl-amine. In yet other embodiments, the latent-boron affinity agent comprises a metal oxide or a metal hydroxide. In still further embodiments, the latent-boron affinity agent comprises an activated solid comprising one selected from the group consisting of activated alumina, activated bauxite, and activated carbon.

In some embodiments, the latent borate-affinity agent may be added as a solid particle in a number of different shapes and forms; forms of solids may include larger spherical particles, rod-like particles, flexible fibers, plate-like solids, and other regular and irregular shapes. Note that if the latent borate-affinity agent is added as a solid, insoluble material, it may be sized in a way that will not damage the productivity of the proppant-pack/fracture; in some such embodiments the size may be selected for compatibility with the proppant mean diameter, which may generally be in a range of from about 100 microns to about 2,000 microns. Smaller particles may fill the porosity and may damage the pack-permeability. In some embodiments, the borate-affinity agent may be provided as a plurality of particles having an average size that does not interrupt the proppant pack. In some such embodiments, the average size may comprise a mean particle diameter in a range of from about 100 to about 2,000 microns, which may approximate the proppant mean diameter. In some embodiments, a concentration of a plurality of such particles may comprise a range of from about 0.1 to about 10% (W/W).

In alternative embodiments, the fracturing fluid may comprise a proppant coated with the latent borate-affinity agent in order to avoid negative interference in the proppant-pack/fracture.

In particular embodiments, the fracturing fluids may employ a gelling agent comprising a guar gum selected from the group consisting of hydroxyethyl guar, hydroxypropyl guar, carboxymethyl guar, carboxymethylhydroxyethyl guar, and carboxymethylhydroxypropyl guar, and combinations thereof and a crosslinking agent comprising a borate.

Fracturing fluids may comprise an additive selected from the group consisting of a salt clay stabilizer, a fluid-weighting agent salt, a fluid loss control agent, an emulsifier, a dispersion aid, a corrosion inhibitor, an emulsion thinner, an emulsion thickener, a viscosifying agent, a surfactant, a foaming agent, a pH control additive, a breaker, a biocide, a stabilizer, a scale inhibitor, a mutual solvent, an oxidizer, a reducer, a friction reducer, a clay stabilizing agent, and any combination thereof. These optional additives are known in the art. Particular additives may include a clay stabilizer or brine which may include potassium chloride, choline chloride, tetramethylammonium chloride, sodium bromide, or other soluble brines; surfactant for formation-wetting alteration; delay agent (ligands that delay the borate crosslink); demulsifiers; buffering agent or other pH-control agent; HT stabilizer; fluid-loss control additive; and scale inhibitors.

In some embodiments, an optional chemical breaker may be included in the fracturing fluids disclosed herein which breaker acts on the polymer gelling agent. Suitable breakers may include any breaker can reduce the viscosity of the fracturing fluid when desired and is suitable for use in the compositions and methods disclosed herein. In some such embodiments, the breaker may comprise a delayed gel breaker that will react with the fracturing fluid after a desired delay period. Suitable delayed gel breakers can be materials that are slowly soluble in water, those that are encapsulated, or those that are otherwise designed to slowly solubilize in the fracturing fluid. In certain embodiments wherein these types of breakers are used, the breaking of the gel does not take place until the slowly soluble breakers are at least partially dissolved in the water and this may be before or after any de-crosslinking/pressure thinning.

Fracturing fluids disclosed herein may comprise a base fluid. Typically a base fluid will be aqueous based, although fracturing fluids are not so limited. Suitable base fluids for use in the fracturing fluids may comprise aqueous base fluids and non-aqueous base fluids. Suitable aqueous base fluids that may be used in the fracturing fluids may include fresh water, salt water, brine, seawater, or any other aqueous fluid that, preferably, does not adversely interact with the other components used in accordance with embodiments disclosed herein or with the subterranean formation.

Aqueous base fluids present in the fracturing fluids may be present in an amount sufficient to substantially hydrate the gelling agent to form a gel in the presence of the crosslinking agent. Suitable nonaqueous base fluids that may be used in the fracturing fluids of may include glycerol, glycol, polyglycols, ethylene glycol, propylene glycol, and dipropylene glycol methyl ether. In some embodiments, the base fluid may be present in the treatment fluids of the present invention in an amount in the range from about 5% to 99.99% by volume of the treatment fluid.

In some embodiments, the base fluids suitable for use in the fracturing fluids may be optionally foamed (e.g., a liquid that comprises a gas such as nitrogen or carbon dioxide). As used herein, the term "foamed" also refers to co-mingled fluids. In certain embodiments, it may desirable that the base fluid is foamed to, inter alia, reduce the amount of base fluid that is required, e.g. in water sensitive subterranean formations, to reduce fluid loss to the subterranean formation, enhance flow back of fluids, and/or to provide enhanced proppant suspension. While various gases can be utilized for foaming the fracturing fluids, nitrogen, carbon dioxide, and mixtures thereof are commonly employed in the art. In examples of such embodiments, the gas may be present in a fracturing fluid in an amount in the range of from about 5% to about 98% by volume of the treatment fluid, or in the range of from about 20% to about 80%. The amount of gas to incorporate into the fracturing fluid may be affected by factors including the viscosity of the fluid.

If desired, the fracturing fluids may also be used in the form of an emulsion. An example of a suitable emulsion may comprise an aqueous base fluid comprising a gelling agent and a suitable hydrocarbon. In some embodiments, the emulsion may comprise about 30% of an aqueous base fluid and about 70% of a suitable hydrocarbon. In some embodiments, the external phase of the emulsion may be aqueous. In certain embodiments, it may be desirable to use an emulsion to, inter alia, reduce fluid loss to the subterranean formation, and/or to provide enhanced proppant suspension. Other benefits and advantages to using emulsions in the methods employing the treatment and fracturing fluids will be evident to one of ordinary skill in the art.

The fracturing fluids may vary widely in density. One of ordinary skill in the art with the benefit of this disclosure will recognize the particular density that is most appropriate for a particular fracturing application. In some embodiments, the density of a non-foamed fracturing fluid may approximate the density of water. In other embodiments, the density of the non-foamed fracturing fluids may range from about 8.3 pounds per gallon to about 15 ppg. One of ordinary skill in the art with the benefit of this disclosure will recognize that the density of any particular fracturing fluid may also vary depending on the addition of certain additives, including, but not limited to, proppant, gas, fluid loss control additives, alcohols, glycols, and/or hydrocarbons. Furthermore, the desired density for a particular fracturing fluid may depend on characteristics of the subterranean formation, including, inter alia, the hydrostatic pressure required to control the fluids of the subterranean formation during placement of the fracture fluids, and the hydrostatic pressure which will damage the subterranean formation.

In some embodiments, the fracturing fluid may comprise a brine. Brines suitable for use in some embodiments may include those that comprise monovalent, divalent, or trivalent cations. Some divalent or trivalent cations, such as magnesium, calcium, iron, and zirconium, may, in some concentrations and at some pH levels, cause undesirable crosslinking of the gelling agent. If a water source is used which contains such divalent or trivalent cations in concentrations sufficiently high to be problematic, then such divalent or trivalent salts may be removed, either by a process such as reverse osmosis, or by raising the pH of the water in order to precipitate out such salts to lower the concentration of such salts in the water before the water is used. Another method would be to include a chelating agent to chemically bind the problematic ions to prevent their undesirable interactions with the gelling agent. Suitable chelants include, but are not limited to, citric acid or sodium citrate. Other chelating agents also are suitable. Brines, where used, may be of any weight. Examples of suitable brines include calcium bromide brines, zinc bromide brines, calcium chloride brines, sodium chloride brines, sodium bromide brines, potassium bromide brines, potassium chloride brines, sodium nitrate brines, sodium formate brines, potassium formate brines, cesium formate brines, magnesium chloride brines, mixtures thereof, and the like. Additional salts may be added to a water source, e.g., to provide a brine, and a resulting viscosified treatment fluid, having a desired density. A preferred suitable brine is seawater. The gelling agents of the present invention may be used successfully with seawater.

EXAMPLES

Rheology characterization carried out on a crosslinked system is illustrative of the pressure-impact on borate-crosslinked fluid systems. FIG. 1 shows the viscosity versus time for an exemplary fluid-formulation, measured at 150° F. The crosslinked gel contained 25 lbm/1,000 gal of guar, 2.95 lbm/1,000 gal borax crosslinker, and 3.5 gal/1,000 gal of a 1.0 mol/L solution of sodium hydroxide in a 10.5 lbm/gal-density base brine weighted with sodium bromide. This measurement of viscosity at varied applied pressures from ambient to 10,000 psi was conducted using a Chandler model 7500. The data in FIG. 1 illustrates a reversible loss of more than about 50% of the viscosity as the fluid is pressurized from ambient to 10,000 psi.

Exemplary fluids for use as treatment or fracturing fluids, in accordance with embodiments disclosed herein, may include similar solutions to that used in FIG. 1 with some additive modifications; formulations may include solutions of guar (about 25 lbm/1,000 gal) and borax (about 4 lbm/1,000 gal) at high pH in lower density brines, such as a base brine of about 2% (w/w) potassium chloride. Formulations may also include solutions of about 0.2 to about 5% underivatized polyvinyl alcohol solids to act as borate-affinity agents upon pressurization and heating to elevated temperatures. Alternative formulations may contain about 2% MGA-derivatized polymer solids added to the fluid to act as boron-affinity agent under elevated pressures.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A method comprising: placing a treatment fluid comprising a crosslinked gel in a wellbore penetrating a subterranean formation, the crosslinked gel comprising: a gelling agent; and a borate crosslinking agent; de-crosslinking a portion of the crosslinked gel, the de-crosslinking induced by a sufficient change in operating pressure, the de-crosslinking providing a release of active sites on the borate crosslinking agent and reducing the viscosity of the treatment fluid; and providing a borate-affinity agent to capture the released active sites on the borate crosslinking agent.

2. The method of claim 1, wherein the treatment fluid comprises a fracturing fluid comprising a proppant.

3. The method of claim 2, wherein the placing step comprises applying the fracturing fluid at a sufficient pressure and at a sufficient rate to fracture the subterranean formation without causing substantial de-crosslinking.

4. The method of claim 2, wherein the de-crosslinking step comprises applying a pressure pulse above fracturing pressure.

5. The method of claim 2, further comprising placing a screen and a fluid suitable for frac-packing in the wellbore.

6. The method of claim 2, further comprising removing the treatment fluid from the wellbore after capture of the released borate crosslinking agent.

7. The method of claim 2, wherein the borate-affinity agent is present in the treatment fluid.

8. The method of claim 2, wherein providing the borate-affinity agent comprises separately introducing it to the treatment fluid immediately prior to performing the de-crosslinking step.

9. The method of claim 2, wherein the borate-affinity agent is coated on the proppant.

10. The method of claim 2, wherein the borate-affinity agent has a greater affinity for the released borate crosslinking agent than the gelling agent.

11. The method of claim 2, wherein the borate-affinity agent is encapsulated.

12. The method of claim 2, wherein the borate-affinity agent comprises a solid polymer.

13. The method of claim 12, wherein the solid polymer comprises an N-methylglucamine modification.

14. The method of claim 2, wherein the borate-affinity agent comprises a metal oxide or hydroxide.

15. The method of claim 2, wherein the borate-affinity agent comprises an activated solid.

16. The method of claim 2, wherein the borate-affinity agent comprises an encapsulated solution.

17. The method of claim 2, wherein the borate-affinity agent is provided as a plurality of particles having an average size that does not interrupt the proppant pack.

18. The method of claim 17, wherein the average size comprises a mean particle diameter in a range of from about 100 to about 2,000 microns.

19. The method of claim 17, wherein a concentration of the plurality of particles comprises a range of from about 0.1 to about 10% (W/W).

20. The method of claim 17, wherein the plurality of particles comprise nanoparticles.

21. The method of claim 2, wherein the wellbore is vertical, horizontal, or deviated.

22. The method of claim 2, wherein the subterranean formation is offshore.

* * * * *